(12) United States Patent
Swaminathan et al.

(10) Patent No.: US 9,829,373 B1
(45) Date of Patent: Nov. 28, 2017

(54) APPARATUS AND METHOD FOR IMPROVING DETECTION PRECISION IN LASER VIBROMETRIC STUDIES

(71) Applicants: Venkataraman Swaminathan, Bridgewater, NJ (US); Sudhir B. Trivedi, Baltimore, MD (US); ChenChia Wang, Newark, DE (US); Feng Jin, Nottingham, MD (US)

(72) Inventors: Venkataraman Swaminathan, Bridgewater, NJ (US); Sudhir B. Trivedi, Baltimore, MD (US); ChenChia Wang, Newark, DE (US); Feng Jin, Nottingham, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 200 days.

(21) Appl. No.: 14/859,973

(22) Filed: Sep. 21, 2015

Related U.S. Application Data (60) Provisional application No. 62/052,579, filed on Sep. 19, 2014.

(51) Int. Cl.
*G01H 9/00* (2006.01)

(52) U.S. Cl.
CPC .................... *G01H 9/00* (2013.01)

(58) Field of Classification Search
None
See application file for complete search history.

(56) References Cited

U.S. PATENT DOCUMENTS

| | | | |
|---|---|---|---|
| 5,070,483 A * | 12/1991 | Berni | G01H 9/00 356/28.5 |
| 6,972,846 B2 | 12/2005 | Lal | |
| 7,406,814 B2 | 8/2008 | Morand | |
| 8,072,609 B1 * | 12/2011 | Trivedi | G01D 5/266 356/486 |
| 8,621,931 B2 | 1/2014 | Phua | |
| 2003/0043696 A1* | 3/2003 | Vakoc | G01H 9/00 367/149 |
| 2003/0189712 A1* | 10/2003 | Pepper | G01H 9/00 356/502 |
| 2007/0091316 A1* | 4/2007 | Lal | G01H 9/002 356/486 |
| 2013/0107276 A1* | 5/2013 | Schussler | G01B 9/02028 356/484 |
| 2016/0178345 A1* | 6/2016 | Kilpatrick | G01H 9/00 356/482 |
| 2016/0231443 A1* | 8/2016 | Reipschlager | G01H 9/004 |

* cited by examiner

*Primary Examiner* — Shawn Decenzo
(74) *Attorney, Agent, or Firm* — John P. DiScala (57) ABSTRACT

A laser vibrometer for measuring the vibratory characteristics of an object and more specifically, a moving object, has an improved signal to noise ratio due to multiple channels. A laser is split into a plurality of channels and then for each channel split again into a reference beam and a probe beam. The probe beam is directed at the object and the back scattered reflections are collected and compared to the reference beam to determine the vibratory characteristics of the object. The received signals from the multiple channels are different, sequential and non-overlapping.

7 Claims, 7 Drawing Sheets

FIG. 5B

APPARATUS AND METHOD FOR IMPROVING DETECTION PRECISION IN LASER VIBROMETRIC STUDIES

FEDERAL RESEARCH STATEMENT

The invention described herein may be manufactured, used, and licensed by or for the U.S. Government for U.S. Government purposes.

CROSS REFERENCE TO RELATED APPLICATION

The present application is a non-provisional application of U.S. provisional application Ser. 62/052,579, filed Sep. 19, 2014, the contents of which are incorporated herein by reference.

BACKGROUND OF INVENTION

Field of the Invention

The present invention relates to measurement, and more particularly to the measurement of vibratory characteristics of an object.

Related Art

Vibrometer technology involves the detection and analysis of pressure waves, such as acoustic waves or water waves that might bear information regarding agitation sources of interest to the observer. Laser vibrometers utilize a beam of light, such as a laser, which is split into two parts. One forms a reference beam and the second forms a sensing beam which impacts the target surface, e.g., the pressure-sensing diaphragm, and is reflected therefrom. The sensing beam is homodyned/heterodyned with the reference beam to produce a phase modulated signal, an interference pattern. This interference pattern models the surface displacement of the target surface, is converted via, an optical interferometer, i.e., a Michelson interferometer, and photodetectors, i.e., photodiodes, to generate a usable, alternating electric current, which mimics the motion/vibration of the target surface, i.e., the pressure-sensing diaphragm.

The vibratory characteristics of objects can be used for a variety of purposes. For example, vibratory characteristics may be used to assess the mechanical loading of a moving object, determine the integrity of components on an assembly line or assess the health conditions of gun barrels or other critical equipment. Accordingly, accurate and precise measurement of these characteristics is desirable.

Determining the mechanical loading of a moving vehicle may be important for security reasons as excessive mechanical loading of a vehicle or passenger could indicate the presence of improvised explosive devices (IEDs) as the IEDs add extra weight to the vehicle. This threat has become ever more prominent in recent years as the threat of terrorism has elevated to levels of greater concern. Additionally, the mechanical loading of a vehicle may be used to determine the wear on a roadway or driving structure or to prolong the life of the roadway as excessive loading may damage it.

In assessing the excessive loading conditions of moving vehicles, current techniques generally involve the deployment on the highway of pavement sensor wires and cables that utilize the phenomenon of piezo-electricity to produce signals when the vehicle's tires are in direct physical contact with the sensor wires and cables. However, the requirement of direct physical contact between the tires and the sensor wires and cables impedes covert deployment of the sensing technology. The clearly visible presence of sensor wires and cables could alert potential terrorists and their scouts, causing them to take alternative routes and avoid the detection of any IEDs onboard their vehicle. Furthermore, it is a technical hurdle to differentiate between different vehicles using the piezo-electric sensor wires and cables since larger trucks can have more than two sets of tires. As such, it can be quite difficult to differentiate between a large truck with four sets of tires or two successively passing small cars with two sets of tires each or even two bicycles traveling side by side. Accordingly, other types of modalities are required to be used together with the prior art piezo-electric sensor wires and cables.

Another known technique involves the use of a conventional optical interferometer-based laser vibrometer to monitor the vibratory characteristic of passing vehicles. However, the presence of optical speckles in the light beams back scattered from the passing vehicle diminishes their effectiveness. The optical speckles result from the non-mirror like finishes of a typical vehicle. Even more challenging is that because vehicles are moving with non-zero speed, both the variation in surface interrogation locations and the very likely presence of wind flow will lead to rapid and random changes in the speckle patterns being collected by the conventional laser vibrometers. Such random and rapidly changing optical speckles cause the conventional laser vibrometers to produce sudden "drop-offs" in readout signals as the conventional laser vibrometers cannot respond as fast as the time varying optical speckles. The drop-offs in output signals render the conventional laser vibrometer un-reliable in monitoring the vibratory signatures of moving vehicles as the output signals are punctuated with unpredictable and erroneous sections of readouts.

Additionally, an improved method for monitoring products on an assembly line is desired. Defective packaging leads to products that could be unsafe for consumption or could result in legal and financial liabilities. For example, defective packaging could render medical vaccines hazardous for human application due to the presence of bacterial contamination.

Current approaches to product integrity assurance cannot be applied on the assembly line as packages are being prepared and produced. These current approaches include off-line testing by using, for example, leak detection via submerging a sample of a finished package under tanks of water or other appropriate fluid to monitor any seepage in the package under test. The packages must be removed from the assembly line and sent to the testing laboratory. The packages are then immersed inside a container filled with the appropriated liquids or gases. Manual or machine vision is then applied to assess the extent of leakage into the packages. Results from these tested individual packages are then extrapolated and applied to other packages from the same manufacturing batches even though they did not undergo any leakage tests.

These approaches are time-consuming and unfit for online real time testing of the packages during the manufacturing process. Further hindering the application of these submerging tests are the costs associated with the off-line laboratories. Furthermore, the off-line testing is performed on only a limited quantity of individual packages while the test results are extrapolated to be applicable to all of the packages fabricated in the same batch. If the packages under test are found to be defective, the whole lot of finished packages and goods are assumed to be defective as well and most likely will need to be repackaged or destroyed, thus leading to further economic inefficiencies.

An improved method for monitoring the physiological conditions of humans is desired. Elevated physiological conditions like increased heartbeat rates and fast breathing could very well indicate the uneasiness of the person that is about to commit unlawful activities. For remotely monitoring the physiological signatures of a person who is in motion, for example, a person on an automatic walkway at an airport, prior art solutions based on microwave sensing have been attempted. In such prior art solutions, microwave radiation is emitted onto the objects being surveyed. The microwaves are partially back reflected from the object. The motion of the person, for example, the heart beating, the breathing imparts a Doppler shift in the frequency of the back reflected microwaves. The amount of Doppler shift is then detected and the underlying motion of the person's surface is reconstructed.

However, these approaches are technically limited due to the relatively long wavelengths of microwaves. Beams of microwaves cannot be focused as tightly in space as other beams such as from a laser. Accordingly, the special distribution of microwave beams can be quite extensive. Such an extensive microwave beam profile will result in confusion in physiological signatures readout in crowded areas where the spacing between two different persons can be comparable to or even shorter than the wavelength of the microwave beams. In such crowded space, the prior art microwave-based technologies will produce readings that are weight-averaged among the many different people simultaneously being illuminated by the microwave beam, hence leading to erroneous readouts and assessments. Another challenge facing the prior-art microwave solutions is that the surface agitation of a person due to his or her heartbeat can be very small in amplitude (i.e. smaller than 0.1 micrometer). Such a length scale is far smaller than the wavelength of the microwave beam and it is technically difficult for microwave based technologies to detect such minute signatures.

Finally, an improved method for monitoring the health and integrity of devices, especially critical devices or devices subject to excessive conditions such as gun barrels. Gun barrels undergo extreme pressure and heat conditions when firing projectiles. Excessive firing frequency and/or extended rounds of firing causes the barrels to exhibit fatigue cracks that threaten the integrity of the barrel. Upon growth to certain extent, the fatigue cracks can cause the barrel to disintegrate and compromise the safety of the operating personnel and/or carrier platform of the gun assembly such as a fighter aircraft.

Presently, inspection of gun barrels typically involves removing the barrel from the gun assembly. Visual inspection via inserting a camera in the barrel is then performed to assess the presence and extent of fatigue cracks. Other current approaches for gun barrel inspection involve the use of ultrasonic inspection techniques that generally require the physical attachment of an ultrasonic transducer to the surface of a gun barrel. Ultrasonic echoes are then monitored to assess the likelihood of the presence and Location of fatigue cracks inside the gun barrel.

However, these techniques involve off-line testing via removal of the barrels from the gun assembly which is time consuming, costly and sometimes impractical. Visual inspection, either manually or via machine vision is time consuming and highly subjective. Furthermore, subsurface fatigue cracks might not exhibit any signs on the surface of the barrel. Hence, visual inspection techniques are unable to produce reliable and accurate assessment on the condition of the gun barrels in a timely manner.

Ultrasonic inspection techniques require a transducer to have excellent physical contact with the surface of the barrel to transmit the inspecting ultrasonic waves while monitoring the echoes back-scattered from the fatigue cracks. Unfortunately, gun barrels in general are of a cylindrical shape with circular surfaces. The relatively small radii of curvature of gun barrels poses severe challenges in ensuring good physical contact between the barrel and the ultrasonic transducers. The lack of good physical contact between the ultrasonic transducer and the gun barrel surface under test leads to reduced transmission of interrogating ultrasounds and the associated echoes beings scattered back from fatigue cracks, resulting in reduced signal to noise ratio and unreliable assessments on the presence and location of fatigue cracks.

Accordingly, there is a need for an improved method of detecting vibratory characteristics of a moving object.

SUMMARY OF INVENTION

The present invention relates to a system, method and devices for measuring the vibratory characteristics of an object.

According to a first aspect of the invention, a laser vibrometer for improving the accuracy of vibratory characteristic data collected from an object by elongating the collection time window supports a plurality of channels of light beam of same frequency for transmission and collection. Each of the plurality of channels transmits and collects in a temporally non-overlapping time period in relation to the other channels.

According to a second aspect of the invention, a method for detecting vibrational characteristics of an object, comprises the steps of: providing a laser vibrometer supporting a plurality of channels of light beam transmission and collection; interrogating an object in sequential non-overlapping time periods by emitting a light beam from each of the plurality of channels in sequential non-overlapping time periods; collecting the back scattered light from the moving object at the channel which emitted that light; generating photocurrents at a photo-EMF sensor based on the back scattered light for each channel; and aggregating the generated photocurrents to improve accuracy of the collected data.

BRIEF DESCRIPTION OF THE DRAWINGS

The accompanying figures further illustrate the present invention.

The components in the drawings are not necessarily drawn to scale, emphasis instead being placed upon clearly illustrating the principles of the present invention. In the drawings, like reference numerals designate corresponding parts throughout the several views.

DETAILED DESCRIPTION

The present invention relates to the detection and measurement of the vibratory characteristics of an object, in particular the vibratory characteristics of a moving object. A laser vibrometer comprises multiple channels of light beam transmission and collection resulting in a higher signal to noise ratio for the collected data. Each of the multiple channels are temporally different, sequential and non-overlapping. Further, the channels are spatially located in relation to the application they are employed in to maximize the coverage of the vibrometer.

Due to the improved signal to noise ratio (SNR) and speckle tolerant operation, the laser vibrometer is particularly suited to accurately determine the vibratory characteristics of moving objects. When conducting remote and non-contact measurements on objects moving relative to the observation base and/or instrumentation, only finite time periods of observation are available to the instrument and observer. These finite and limited observation time periods contribute to uncertainties and inaccuracies in determining the vibratory characteristics of the moving object being investigated. Furthermore and specific to laser-based interrogation technologies, without active laser pointing and tracking, the relative motion between the object and the observation instrument implies that the interrogating laser beam shall in effect scan along and throughout the length of the moving object's surface. The variation in laser interrogation locations, in addition to the airflows caused either by the motion of the moving objects and/or that might occur naturally in the ambient environment, imposes randomly changing optical speckle patterns in the light beams being scattered back from the surface of the moving object. These randomly varying optical speckle patterns can interfere with conventional optical interferometer-based detection technologies.

To improve the accuracy and precision in evaluating the vibrational characteristics of moving objects, the present multi-channel laser vibrometer is hence devised to possess multiple interrogating channels with each channel projecting and collecting its own light beams independently from the other channels. Each channel is responsible for interrogating the moving object at different, sequential, and non-overlapping time periods. These temporally sequential and non-overlapping investigations by the multiple of channels constitute, in effect, elongated observation time periods on the moving object, once the independent outputs from the various channels are combined appropriately in time. With the effectively elongated observation time period, better and more precise assessments are hence achieved on the vibratory characteristics of the moving object, for example but not limited to, the vibration frequencies.

Furthermore, utilizing multiple channels eliminates the need for active laser beam tracking, aiming, and control, as is necessary when an elongated observation time period is achieved by using devices and technologies that rely on single-channel of light beams. Devices and technologies employing a single-channel of light and active beam tracking, aiming, and control generally involve large oblique light beam incidence angles onto the surface of the moving object. The large oblique incidence angles lead to drastically reduced back-scattered photon density towards the direction where the collection optics are generally located. This subsequent reduction in photon collection further leads to reduced SNRs and inaccurate assessments on the vibratory characteristics of the moving object.

In contrast, the multi-channel laser vibrometer achieves an elongated observation time period while maintaining better back-scattered light beam collection efficiency. The improved collection efficiency for back-scattered photons leads to improved detection signal-to-noise ratios (SNRs) and hence more accurate and precise assessments. The improved photon collection efficiency is attributed to the fact that the multiple of channels of our present vibrometer can be configured so as to project and collect the back-scattered light beams in a direction that is approximately perpendicular to the surface of the moving object, thus maximizing the back-scattered photon density along the direction where the collection optics situate.

Further advantages are achieved by the adoption of an optical speckle-tolerant laser vibrometer to monitoring the vibratory characteristics and signatures of an object that is moving with finite and non-zero speed. The capability of optical speckle-tolerance is necessitated by the fact that, when monitoring moving objects using laser beams, time-varying speckles in the back-scattered light beams from the moving objects are naturally and logically expected. The time-varying speckles are present due to the fact that: (1) an absolute majority of objects encountered do not have mirror-like surface finishes; and (2) as the object moves along, different surface locations are illuminated by the interrogating light beam and therefore the speckle pattern will naturally vary in time. Furthermore, movement of the object could induce ambient environmental disturbances like airflows, which further impose random modulation onto the resultant speckle patterns being received at the sensor end.

The present optical speckle-tolerant laser vibrometer can perform reliably even in the presence of time-varying speckle patterns in the light beams being back-scattered from the moving object under investigation.

Therefore, as aided by the optical speckle-tolerant advantages of the pulsed laser vibrometer along with the deployment of multiple sensing channels, the present laser vibrometer offers reliable, real-time assessments, with improved accuracy, on the vibratory characteristics of a variety of objects that are moving at finite and non-zero speed.

In one application, the laser vibrometer can be employed to determine the mechanical loading of a truck entering an area. Advantageously, abnormal loading conditions may indicate the threat of vehicular carried explosive. In another application, the integrity of product packaging on an assembly line may be assessed by the laser vibrometer. Advantageously, the object to be tested does not need to be removed from the assembly line and all products may be tested rather than a subset if desired. The laser vibrometer can be used to measure physiological characteristics of a person on an airport automatic walkway to determine stress responses which may indicate a potential threat. Finally, the laser vibrometer may be used to assess the integrity of gun barrels or other critical components subject to high stress levels during use such as the rotating barrels of Gatling guns firing projectiles.

Figure 1:
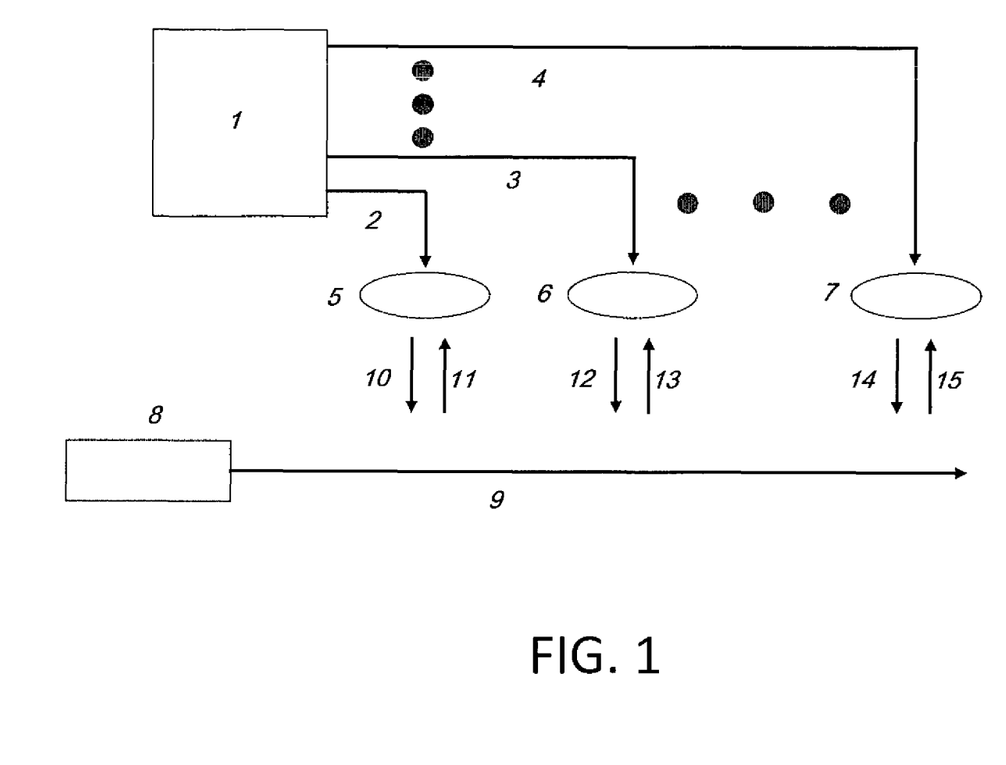
FIG. 1 shows a system for measuring the vibratory characteristics of a moving object, in accordance with one illustrative embodiment of the invention.

FIG. 1 shows an optical speckle-tolerant pulsed laser vibrometer for measuring the vibratory characteristics of a moving object, in accordance with one illustrative embodiment of the invention. The optical speckle-tolerant pulsed laser vibrometer 1 is further configured to support multiple channels 2, 3, 4 of light beam emission and collection. The multiple channels 2, 3, and 4 for light beam transportation to and from the optical speckle-tolerant pulsed laser vibrometer 1 and the moving object, 8, may consist of, for example but not limited to, optical fiber transmission cables and wires. The multiple of channels 2, 3, and 4, are further terminated with optical apparatus 5, 6, and 7, respectively. The optical apparatus 5, 6, and 7 are responsible for projecting light beams onto the moving object, 8, traveling along the direction 9. The same optical apparatus 5, 6, 7 are further responsible for collecting back-scattered light beams from the surface of the moving object, 8.

In operation, the optical speckle-tolerant pulsed laser vibrometer, 1, emits multiple beams of light. The multiple light beams are further separated and directed into their separate and independent channels 2, 3, and 4. The light beams then travel along the multiple channels 2, 3, and 4, and exit from their respective optical apparatus 5, 6, 7. The light beams 10, 12, and 14, exit respectively from optical apparatus 5, 6, and 7, and impinge onto the surface of the moving object, 8, as it comes within view of the individual optical apparatus. The light beams, 11, 13, and 15, scattered back from the surface of the moving object, 8, are further collected by their respective optical apparatus 5, 6, and 7. The collected back-scattered light beams 11, 13, and 15, then travel along their respective channels 2, 3, and 4, and are retrieved by the optical speckle-tolerant pulsed laser vibrometer, 1, for signal detection, processing, analyses, and data presentation.

The multiple channels 2, 3, and 4, and their respective optical apparatus 5, 6, and 7, are configured to possess various scale of optical path lengths. The optical path length is defined as the effective distance that a light beam travels upon its exit from the laser source of the optical speckle-tolerant pulsed laser vibrometer 1 and return to the detector's surface of the optical speckle-tolerant pulsed laser vibrometer 1, which includes: travel along one of the multiple of channels 2, or 3, or 4; passage through the respective optical apparatus 5, or 6, or 7; travel to the moving object's, 8, surface; followed by the back-scattered light beam's passage from the surface of the moving object back to the optical apparatus, either 5, 6, or 7; and the back-scattered light beam's travel along the multiple of channels, either 2, 3, or 4.

The optical path lengths of different scales enable the light beams traveling along the multiple of channels 2, 3, and 4, to investigate the moving object, 8, at temporally different, sequential, and non-overlapping periods. The signals resulting from the temporally different, sequential, and non-overlapping periods are then combined electronically via electronic circuitry and/or computer data manipulation to produce assessments on the vibratory characteristics of the moving object, 8, with improved accuracy and reliability than prior-arts.

The optical apparatus, 5, 6, and 7, are further arranged spatially so as to achieve and maintain maximal collection amounts of the back-scattered light beams, 11, 13, and 15, back into the respective optical apparatus, 5, 6, and 7. The maximal collection amounts of the back-scattered light beams are desired so as to maximize the detection sensitivity and accuracy in assessing the vibratory characteristics of the moving object, 8. The spatial arrangements of the optical apparatus 5, 6, and 7, include but are not limited to, arranging the optical apparatus 5, 6, and 7, in manners so as to achieve and maintain approximately perpendicular incidence of the interrogating light beams, 10, 12, and 14, onto the surface of the moving object, 8, when it comes into their respective field of view. The optical apparatus 5, 6, and 7, are further positioned at such distances from the surface of the moving object, 8, that maximal amount of back-scattered light beams can be collected by each of the multiple of optical apparatus, 5, 6, and 7.

The multiple of channels of light beam transmission, 2, 3, and 4, consist of, for example but not limited to, optical fiber transmission cables and wires. The optical fiber transmission cables and wires can be, for example but not limited to, single-mode, multi-mode, or polarization-maintaining in nature.

Figure 2:
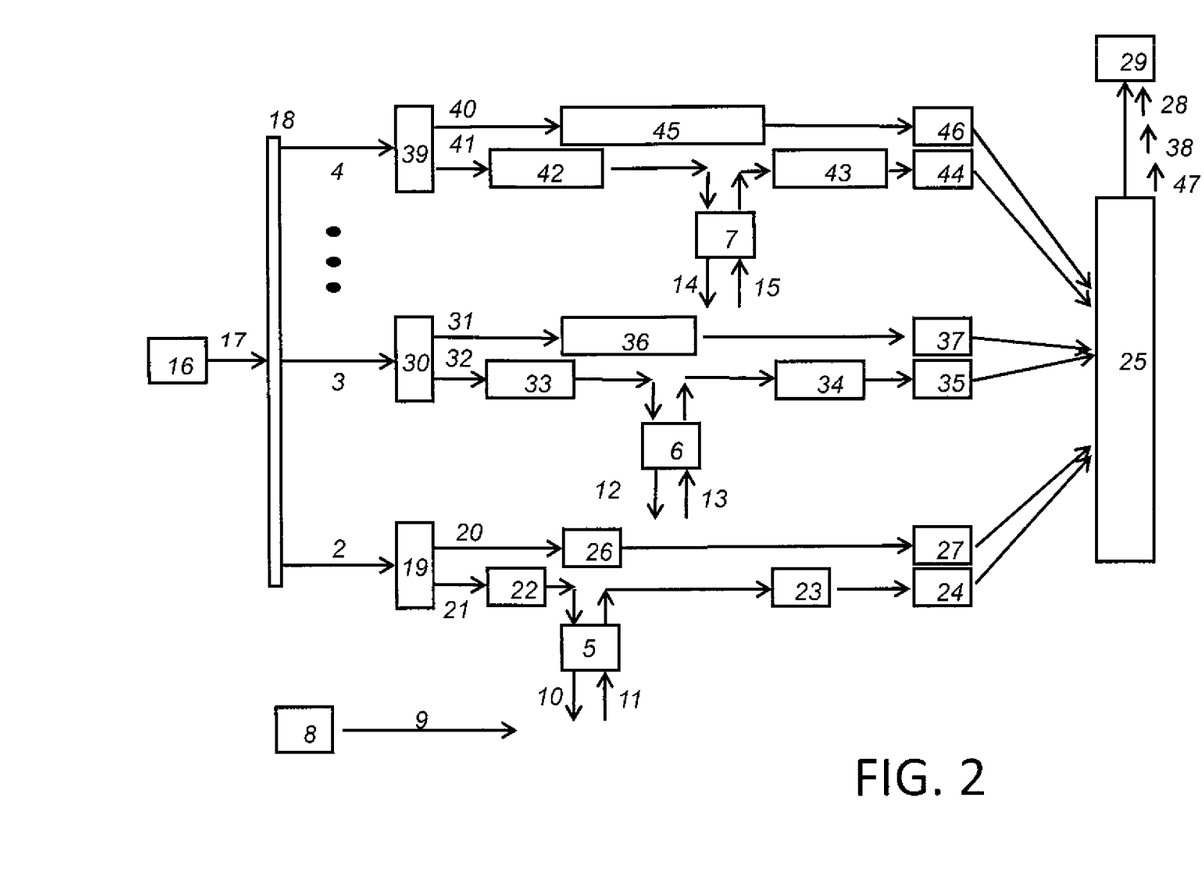
FIG. 2 shows a system for measuring the vibratory characteristics of a moving object, in accordance with one illustrative embodiment of the invention.

FIG. 2 shows an optical speckle-tolerant pulsed laser vibrometer for measuring the vibratory characteristics of a moving object, in accordance with one illustrative embodiment of the invention. The optical speckle-tolerant pulsed laser vibrometer 1 and the multiple channels 2, 3, and 4, are illustrated in more schematic detail in FIG. 2. The optical speckle-tolerant pulsed laser vibrometer further comprises a laser source 16. The laser source 16 emits a laser beam 17 consisting of trains of laser pulses with certain pulse width, pulse energy, and pulse repetition rate. The laser beam output 17 is further split into multiple of beams by the beam splitting element 18 to form the laser beams used in the multiple of channels 2, 3, and 4.

For the channel designated numerically as 2 in FIGS. 1 and 2, the laser beam is further split by the beam splitting element 19 into two arms: the reference arm 20 and the probe arm 21. The light beam forming the probe arm 21 further travels down the optical transmission cable and wire 22, of certain length. Upon exiting from the optical transmission cable and wire, 22, the light beam enters the optical apparatus 5, before finally being projected as interrogating light beam 10 onto the moving object 8 moving along the direction 9. The back-scattered light beam 11 originating from the moving object's surface is then collected by the optical apparatus 5 and sent traveling along the optical transmission cable and wire 23. Upon exiting the optical transmission cable and wire 23 the light beam is directed by the optical apparatus 24 and projected onto the photo-electromagnetic field (EMF) detector 25. The light beam traveling along the reference arm 20 makes its passage through the optical transmission cable and wire 26 before being directed by the optical apparatus 27 onto the photo-EMF sensor 25 where it interacts with the collected back-scattered light beam 11 and the photo-EMF sensor 25. The interaction between the light beams and the photo-EMF sensor 25 generates photocurrent pulses 28 which is further sent through to the electronic detection circuitry, processing circuitry and computer program-based processing and presentation. The effective path lengths along the reference arm 20 and the probe arm 21 tracing from the beam splitting element 19 and ending at the photo-EMF sensor, 25, are arranged and maintained to become approximately equal.

The light beam traveling along the channel designated numerically as 3 and depicted in FIGS. 1 and 2, is further split by the beam splitting element 30 into the reference arm 31 and the probe arm 32. The light beam traveling along the probe arm 32 makes passage through the optical transmission cable and wire 33 before entering the optical apparatus 6. The optical apparatus 6 then projects the light beam as interrogation light beam 12 onto the surface of the moving object, 8, when it comes within the view of the optical apparatus 6. Subsequently, the back-scattered light beam 13 is collected by the optical apparatus 6 which further sends it down the optical transmission cable and wire 34. Upon its exit from optical transmission cable and wire 34, the light beam is directed by the optical apparatus 35 onto the surface of the photo-EMF detector 25. The light beam passing along the reference arm 31 travels through the optical transmission cable and wire 36 and, upon its exit, is further directed by the optical apparatus 37 onto the surface of the photo-EMF sensor 25 in which its interaction with the collected back-scattered light beam 13 and the photo-EMF sensor 25 produces photocurrents 38 that are sent to the electronic detection circuitry, processing circuitry, and computer program-based processing and presentation. The effective path lengths along the reference arm 31 and the probe arm 32 tracing from the beam splitting element 30 and ending at the photo-EMF sensor 25 are arranged and maintained to become approximately equal.

The total path length experienced by the light beams traveling in the channel designated numerically as 2 in FIGS. 1 and 2 is sufficiently different from that experienced by the light beams passing through the channel designated numerically as 3 in FIGS. 1 and 2. The sufficiency is defined as the effective length difference such that the photocurrent signals 28 generated by the light beams in channel 2 do not overlap in time with the photocurrents 38 that are produced from the photo-EMF sensor 25 by the light beams traveling in channel 3.

The light beam traveling along the channel designated numerically as 4 and depicted in FIGS. 1 and 2, is further split by the beam splitting element 39 into the reference arm 40 and the probe arm 41. The light beam traveling along the probe arm 41 makes passage through the optical transmission cable and wire 42 before entering the optical apparatus 7. The optical apparatus 7 then projects the light beam as interrogation light beam 14 onto the surface of the moving object 8 when it comes within the view of the optical apparatus 7. Subsequently, the back-scattered light beam 15 is collected by the optical apparatus 7 which further sends it down the optical transmission cable and wire 43. Upon its exit from optical transmission cable and wire 43, the light beam is directed by the optical apparatus 44 onto the surface of the photo-EMF detector 25. The light beam passing along the reference arm 40 travels through the optical transmission cable and wire 45 and, upon its exit, is further directed by the optical apparatus 46 onto the surface of the photo-EMF sensor 25 in which its interaction with the collected back-scattered light beam 15 and the photo-EMF sensor 25 produces photocurrents 47 that is sent to the electronic detection circuitry, processing circuitry, and computer program-based processing and presentation. The effective path lengths along the reference arm 40 and the probe arm 41 tracing from the beam splitting element 39 and ending at the photo-EMF sensor, 25, are arranged and maintained to become approximately equal.

The total path length experienced by the light beams traveling in the channel designated numerically as 4 in FIGS. 1 and 2 is sufficiently different from that experienced by the light beams passing through the channels designated numerically as 3 and 2 in FIGS. 1 and 2. The sufficiency is defined as the effective length difference such that the photocurrent signals 47 generated by the light beams in channel designated by the numeral 4 do not overlap in time with the photocurrents 38 that are produced from the photo-EMF sensor 25 by the light beams traveling in channel designated numerally as 3, and the photocurrents 28 that are produced from the photo-EMF sensor 25 by the light beams traveling in the channel designated by the numeral 2.

Advantageously, as the light beams are collected at non-overlapping time periods, a single EMF-sensor may be employed by the laser vibrometer thereby reducing size, complexity and cost of the laser vibrometer.

The photocurrents 28, 38, and 47, respectively generated by the channels designated numerically as 2, 3, and 4, are combined following specific procedures by the electronic circuitry, 29 and aided further by computer based processing, analyses, and data presentation to determine the vibratory characteristics of the moving object 8. Criteria are considered using, usually but not limited to, computer program-based decision processes to produce assessments including, for example but not limited to, the excessive loading conditions of a passing vehicle, the fail or pass on the packaging integrity, the elevated physiological states of a passing person, and the presence of fatigue cracks in gun barrels. Computer based decision processes may be implemented in hardware, software or some combination thereof.

While the embodiments shown in FIGS. 1 and 2 comprise three independent channels, it is understood that additional channels can be added with appropriate modifications and additions to the supporting optical and mechanical components and related signal detection, processing, analyses, and presentation electronic circuitry and computer programming.

The laser source 16 depicted in FIG. 2 produces pulses of laser light. The laser pulses can be produced via, for example but not limited to, mode-locking, Q-switching, gain-switching, and other appropriate means.

While the embodiment shown in FIG. 2 comprises a single laser source 16, it is understood that multiple laser sources with similar lasing wavelengths can be deployed to establish the multiple of channels described.

While the embodiment shown in FIG. 2 is a single photo-EMF sensor 25, it is understood that multiple sensors can be deployed, in conjunction with the multiple laser sources described in prior paragraph, to result in the multiple of channels. The use of multiple photo-EMF sensors should also involve the associated modifications and additions to the optical and mechanical components and arrangements.

Figure 3:
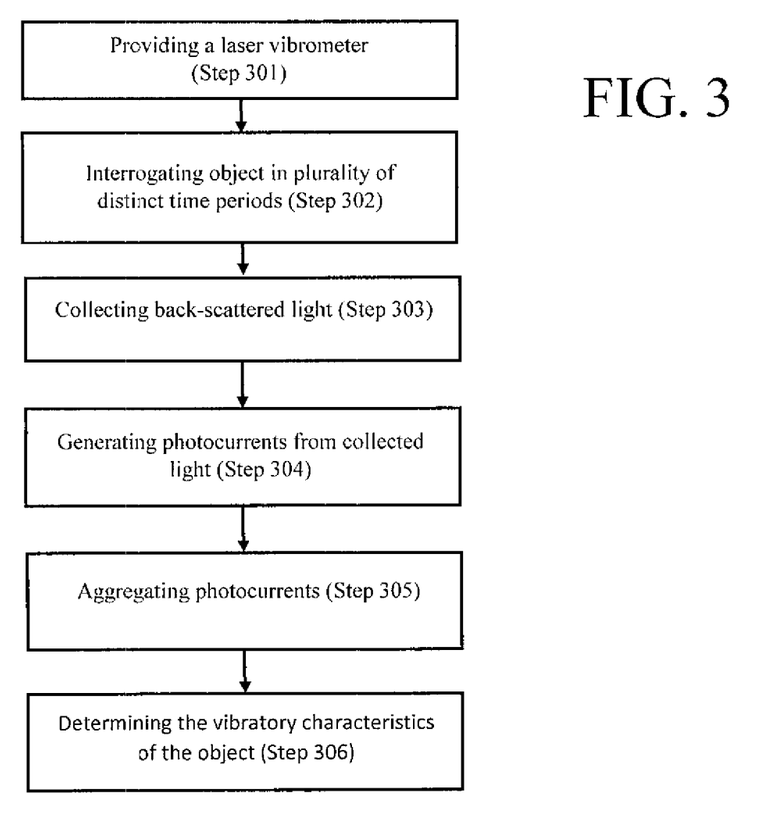
FIG. 3 is a flowchart illustrating steps for a method of measuring the vibratory characteristics of a moving object, in accordance with one illustrative embodiment of the invention.

FIG. 3 is a flowchart illustrating steps for a method of measuring the vibratory characteristics of a moving object, in accordance with one illustrative embodiment of the invention.

In step 301, an optical speckle-tolerant pulsed laser vibrometer supporting multiple channels of light emission and collection is provided. The multiple channels of light emission and collection are arranged spatially to maximize coverage of the moving object.

In step 302, a moving object is interrogated with the plurality of channels supported by the laser vibrometer. A plurality of light beams are emitted from each of the plurality of channels in sequential and non-overlapping time periods to lengthen observation time window width.

In step 303, the back scattered light from the moving object for each interrogation channel is collected at that channel and directed to a surface of the photo-EMF sensor of the laser vibrometer.

In step 304, photocurrents are generated at the photo-EMF sensor from the collected light and a reference beam for each channel of collected light.

In step 305, the photocurrents generated by the channels are combined following specific procedures by the electronic circuitry.

In step 306, the vibratory characteristics of the moving object are determined from the combined photocurrents by computer based processing, analyses, and data presentation.

In one embodiment of the invention, the laser vibrometer is implemented at a security checkpoint or similar location to determine the loading conditions of a motor vehicle. Referring back to FIG. 1, in this embodiment, the moving object 8 is a vehicle moving across the interrogation light beams 10, 12, and 14, in ways that form an approximate right angle between the interrogation light beams, 10, 12, and 14, and the surface of the vehicle.

Figure 4A:
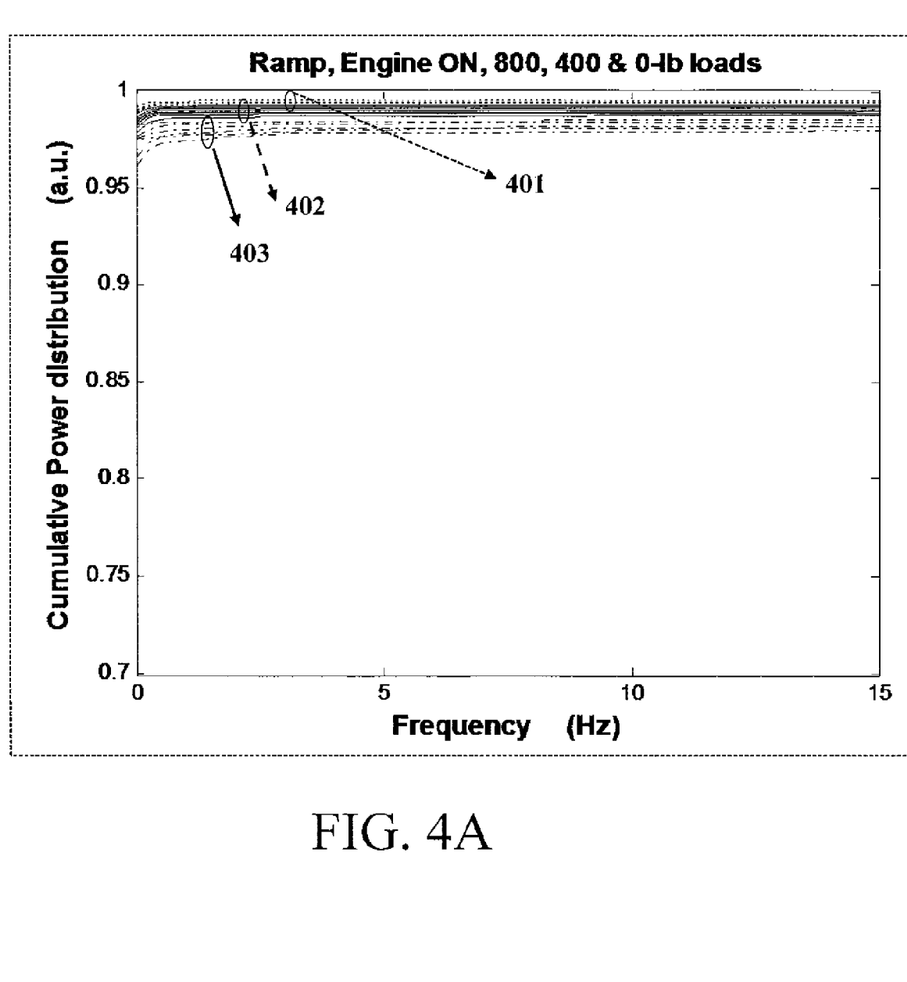
FIG. 4A is a plot showing results of testing of a two-channel laser vibrometer, in accordance with one illustrative embodiment of the invention.
Figure 4B:
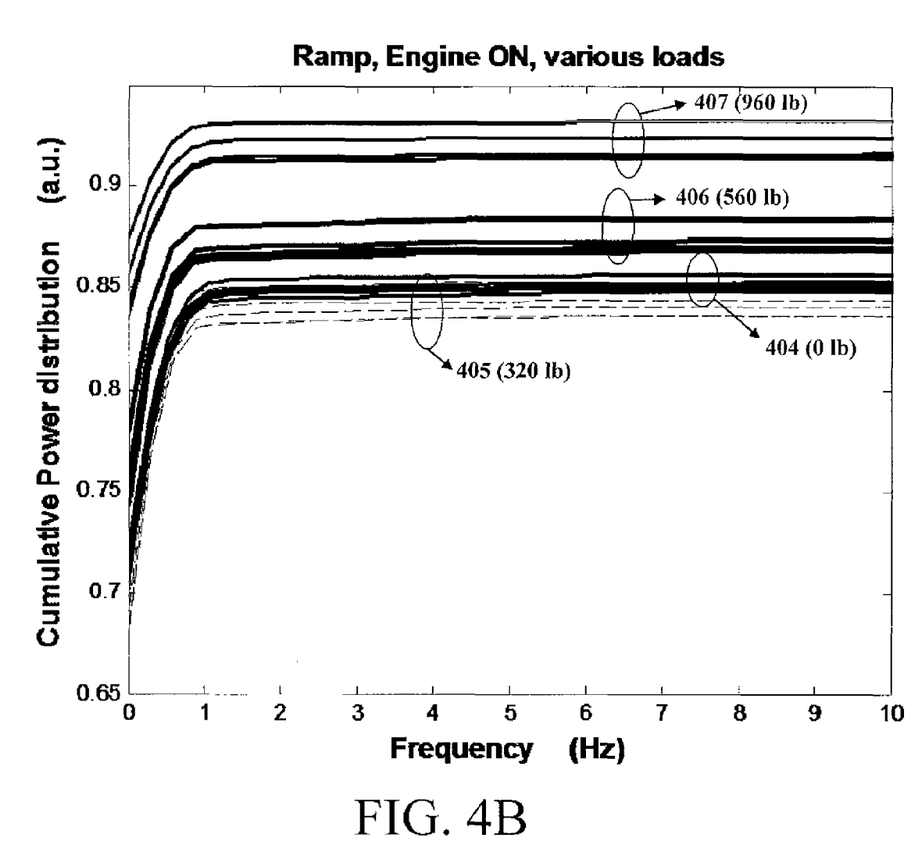
FIG. 4B is a plot showing results of testing of a single-channel laser vibrometer, in accordance with one illustrative embodiment of the invention.

FIG. 4A is a cumulative power distribution plot showing results of testing of a two-channel laser vibrometer, in accordance with one illustrative embodiment of the invention. FIG. 4B is a cumulative power distribution plot showing results of testing of a single-channel laser vibrometer, in accordance with one illustrative embodiment of the invention. Advantageously, the speckle resistant laser vibrometer with multiple channels results in more accurate readings and less deviation between readings when compared to a single channel laser vibrometer.

In tests performed by the inventors, a vehicle under test travelled along a given path at a speed of approximately seven miles per hour under loading conditions varying incrementally from zero pounds to nine hundred and sixty pounds. Along this given path, the vehicle passed through either the various interrogation light beams of the optical speckle tolerant laser vibrometer or a control single channel laser vibrometer. During these tests, vehicles tested include a white Ford Ranger model, manufactured in 1993 by the Ford Motor Company of Detroit Mich, and a beige Chevy Impala, model year 2009 by the Chevrolet division of General Motors Company of Detroit Mich.

The vehicle repeated its passage in front of the multiple of channels of the optical speckle tolerant laser vibrometer a multiple number of times under a given loading condition so as to obtain a multiple of readings and assessments on the vibratory characteristics of the vehicle. The multiple of readings and assessments obtained from the passing vehicle under a given loading condition were collected, processed, and analyzed. The data processing and analyses involved signal filtering and was further followed by the computation of the corresponding cumulative vibratory energy distributions versus the vibratory frequency.

It is well understood that, for a given vehicle, a larger amount of excessive load leads to resultantly heavier overall weight. It is further understood that heavier objects will have lower resonant vibratory frequencies. Due to the relatively complex structures of a vehicle, the lower resonant vibratory frequencies exhibit themselves in the form of vibratory energy concentration towards the lower frequency band. Hence, for a given vehicle, a heavier amount of excessive load shall result in a cumulative vibratory energy distribution curve that rises rapidly from the 0 Hz frequency and onward. On the other hand, a lighter load for the same vehicle will generate a cumulative vibratory energy distribution trace that climbs relatively slower in frequency.

Multiple readings and assessments obtained from under a given loading condition of the light truck will naturally show a certain extent of variations and inconsistencies due simply to the measurement uncertainties and noise that are naturally present and expected in the data collection systems. The extent of variations and inconsistencies lead correspondingly to variations in the calculated cumulative vibratory energy distribution traces versus vibratory frequency. The extent of these variations and inconsistencies can further be represented by the statistical means and standard variations derived from the congregate of cumulative vibratory energy distribution curves obtained from the same vehicle and under a given and fixed amount of excessive loading. A large standard deviation value corresponds to relatively speaking greater amount of variations and inconsistencies.

In the testing performed, the optical speckle-tolerant pulsed laser vibrometer possessing the multiple channels were configured sequentially into two different fashions. In the first configuration, the laser vibrometer supported only a single channel whereas in the second configuration, the pulsed laser vibrometer supported two independent channels. The single-channel configuration assessed and measured the vibratory characteristics of the Chevy Impala passenger car. The two-channel configuration investigated and assessed the vibratory signatures of the Ford Ranger light truck.

In FIGS. 4A and 4B is depicted the calculated cumulative vibratory energy distribution traces obtained respectively from the two-channel configuration and the single-channel arrangement. On the vertical axis, the cumulative power distribution is represented as arbitrary unit (au). On the horizontal axis, the frequency of the vibratory energy is represented in hertz (Hz). Table 1 and Table 2 show the data collected to create the plots in FIGS. 4A and 4B, respectively. Visual inspection of the two plots shows the relatively tight convergence of cumulative vibratory energy distribution curves obtained from the two-channel configuration.

As a contrast, the cumulative vibratory energy distribution curves retrieved from the single-channel configuration exhibit significant spread, for a given and fixed amount of excessive load. For example, a first band shows the distribution curves for loading at nine hundred and sixty pounds. Visual inspection of this band shows that qualitatively, the distribution of the curves is more spread out in the plot of FIG. 4b.

As the two-channel configuration leads to lengthened observation time window width, as expected, the two-channel configuration result in smaller and narrower deviations and inconsistencies in the calculated cumulative vibratory energy distribution curves, and hence more accurate assessments on the loading conditions, than the single-channel configuration.

TABLE 1

Percent of energy below 2 Hz at loading conditions for each test of two-channel configuration and calculated mean and standard deviation of percents

| Vehicle Loading (lb) | % of energy contained below 2 Hz | Mean | Standard Deviation |
|---|---|---|---|
| 0 | 0.9833, 0.9771, 0.9813, 0.9828, 0.9791, 0.9759 | 0.9799 | 0.0030 |
| 400 | 0.9897, 0.9877, 0.9909, 0.9889, 0.9899, 0.9903, 0.9894, 0.9900, 0.9858, 0.9922, 0.9915, 0.9917 | 0.9898 | 0.0018 |
| 800 | 0.9930, 0.9933, 0.9927, 0.9917, 0.9938, 0.9918, 0.9916, 0.9915, 0.9949, 0.9939, 0.9935, 0.9937, 0.9931 | 0.9930 | 0.0011 |

TABLE 2

Percent of energy below 6 Hz at loading conditions for each test of one-channel configuration and calculated mean and standard deviation of percents

| Vehicle Loading (lb) | % of energy contained below 6 Hz | Mean | Standard Deviation |
|---|---|---|---|
| 0 | 0.8525, 0.8496, 0.8476, 0.8562, 0.8507 | 0.8513 | 0.0032 |
| 320 | 0.8361, 0.8533, 0.8364, 0.8407, 0.8441 | 0.8421 | 0.0071 |
| 560 | 0.8675, 0.8834, 0.8681, 0.8725, 0.8693 | 0.8722 | 0.0066 |
| 960 | 0.9135, 0.9155. 0.9154, 0.9316, 0.9231 | 0.9198 | 0.0075 |

Figure 5A:
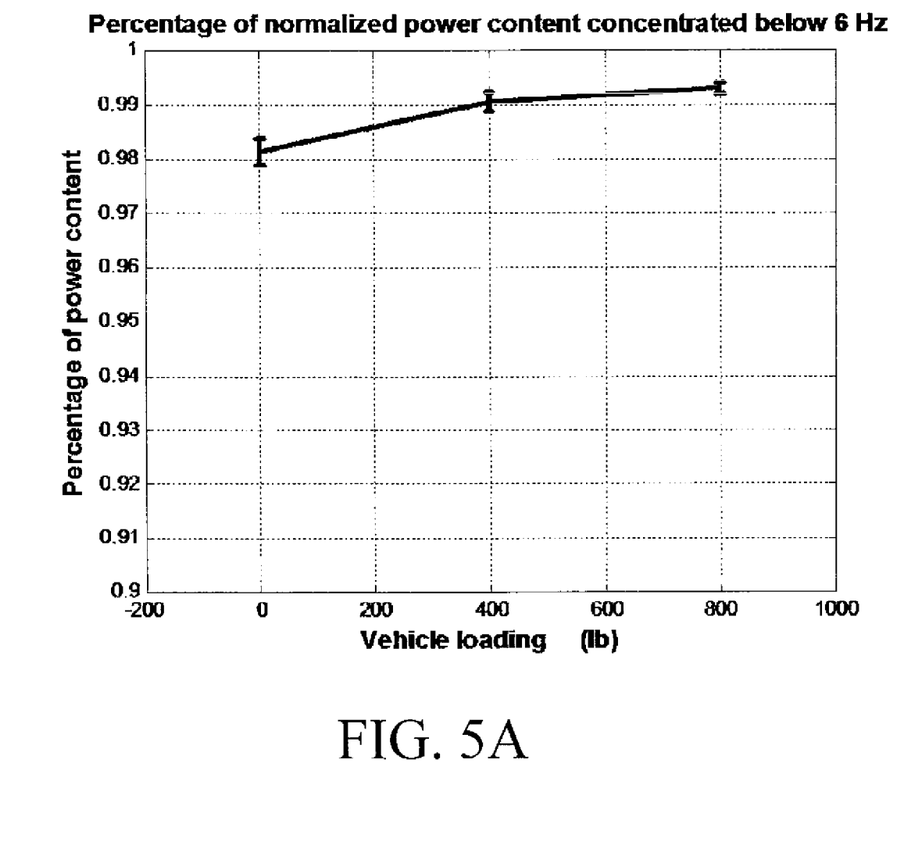
FIG. 5A is a plot showing results of testing of a two-channel laser vibrometer, in accordance with one illustrative embodiment of the invention.
Figure 5B:
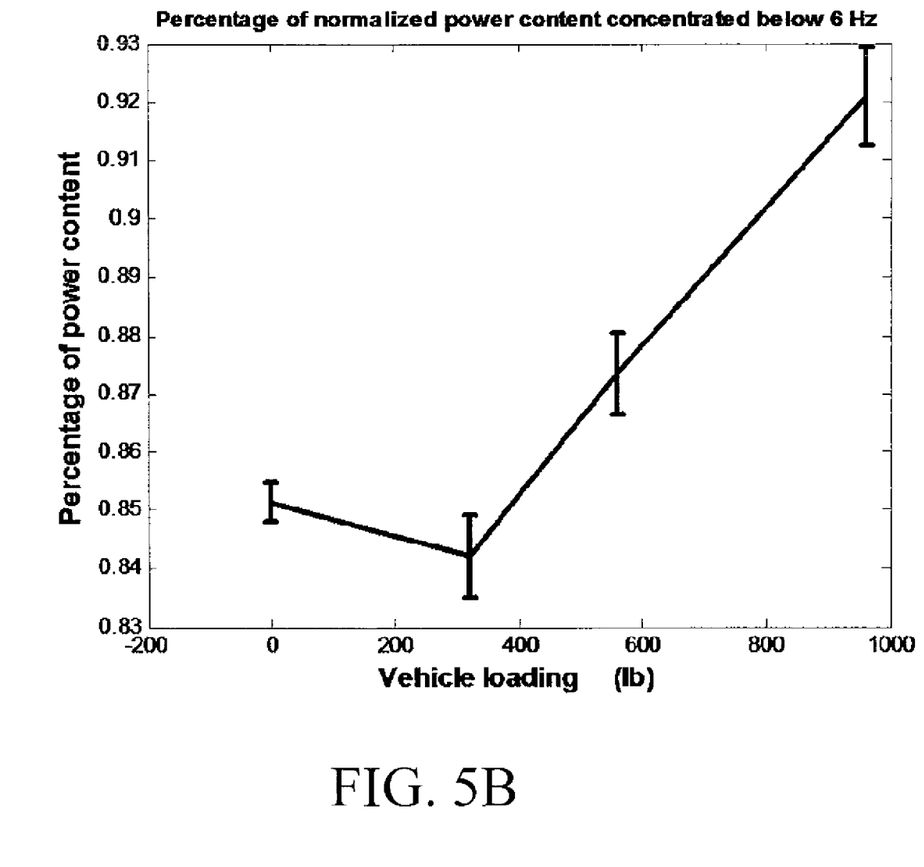
FIG. 5B is a plot showing results of testing of a single-channel laser vibrometer, in accordance with one illustrative embodiment of the invention.

FIG. 5A is a plot showing results of testing of a two-channel laser vibrometer, in accordance with one illustrative embodiment of the invention. FIG. 5B is a plot showing results of testing of a single-channel laser vibrometer, in accordance with one illustrative embodiment of the invention. Table 3 and Table 4 show the data for the mean and standard deviation used to create the plots shown in FIG. 5A and FIG. 5B, respectively. Further demonstrating the advantages of the optical speckle tolerant pulsed laser vibrometer supporting multiple channels in which the statistical means and standard deviations of the congregate of cumulative vibratory energy distribution curves, obtained for a given vehicle and under a given amount of excessive load, are plotted versus the excessive vehicular loading amount. FIGS. 5A and 5B show that, by leveraging the multiple of channel, the two-channel configuration produces assessments and evaluations with significantly less amount of uncertainties and inconsistencies, as exhibited in the form of significantly smaller standard deviation values.

TABLE 3

Mean and standard deviation of data obtained from two-channel configuration

| Vehicle Loading (% of GVW) | Mean | Standard Deviation |
|---|---|---|
| 0 | 0.9799 | 0.0030 |
| 9.5 | 0.9898 | 0.0018 |
| 19.0 | 0.9930 | 0.0011 |

TABLE 4

Mean and standard deviation of data obtained from single-channel configuration

| Vehicle Loading (% of GVW) | Mean | Standard Deviation |
|---|---|---|
| 0 | 0.8513 | 0.0032 |
| 9.0 | 0.8421 | 0.0071 |
| 15.8 | 0.8722 | 0.0066 |
| 27.0 | 0.9198 | 0.0075 |

In another embodiment, the laser vibrometer is implemented at a factory assembly line or similar location to determine the package integrity of objects moving on the assembly line. Referring back to FIG. 1, in this embodiment, the moving object 8 is a product on an assembly line moving across the interrogation light beams 10, 12, and 14. A defective packaging and/or loosely assembled sub-component generally exhibits itself in the form of elevated vibrational frequencies which may be determined by analyzing the collected back scattered light from the packaging.

In another embodiment, the laser vibrometer is implemented at a high risk facility such as an airport or similar location to determine the presence of elevated physiological states of a passing person. Referring back to FIG. 1, in this embodiment, the moving object 8 is a person, either walking or on a moving platform moving across the interrogation light beams 10, 12, and 14.

While the optical speckle tolerant laser vibrometer supporting multiple channels is particularly useful in applications with a moving object, it is not limited to interrogating moving objects. In another embodiment, the laser vibrometer is implemented at a testing area or similar location to determine the presence of fatigue in a gun barrel. Referring back to FIG. 1, in this embodiment, the object 8 is a gun barrel vibrating in place due to operation or external agitation such as from a test probe.

We claim:

1. A method for detecting vibrational characteristics of an object, the method comprising the steps of:
   providing a laser vibrometer supporting a plurality of channels of light beam transmission and collection;
   interrogating an object in sequential non-overlapping time periods by emitting a light beam from each of the plurality of channels in sequential non-overlapping time periods;
   collecting the back scattered light from the moving object at the channel which emitted that light;
   generating photocurrents at a photo-EMF sensor based on the back scattered light for each channel; and
   aggregating the generated photocurrents to improve accuracy of the collected data.

2. The method of claim 1 wherein the step of providing the laser vibrometer further comprises the step of providing the laser vibrometer with the plurality of channels arranged spatially to maximize coverage of the moving object.

3. The method of claim 2 wherein the step of providing the laser vibrometer further comprises the step of providing the laser vibrometer with the plurality of channels arranged sequentially in a linear line perpendicular to the path of the moving object.

4. The method of claim 1 further comprising the step of splitting a laser beam into a plurality of non-frequency shifted split beams, each One of the split beams corresponding to one of the plurality of channels.

5. The method of claim 4 further comprising the step of directing each split laser beam along a transmission path of the corresponding one of the plurality of channels selected for providing a non-overlapping time period for that channel.

6. The method of claim 1 wherein the step of generating photocurrents further comprises the step of generating photocurrents at a single EMF sensor.

7. The method of claim 6 wherein the step of generating photocurrents further comprises the step of generating photocurrents at the single EMF sensor based on homodyne comparison between the back scattered light and a reference beam.

* * * * *